July 17, 1951        T. L. FAWICK        2,561,103
CUSHIONED GEAR
Original Filed April 27, 1945        2 Sheets-Sheet 1
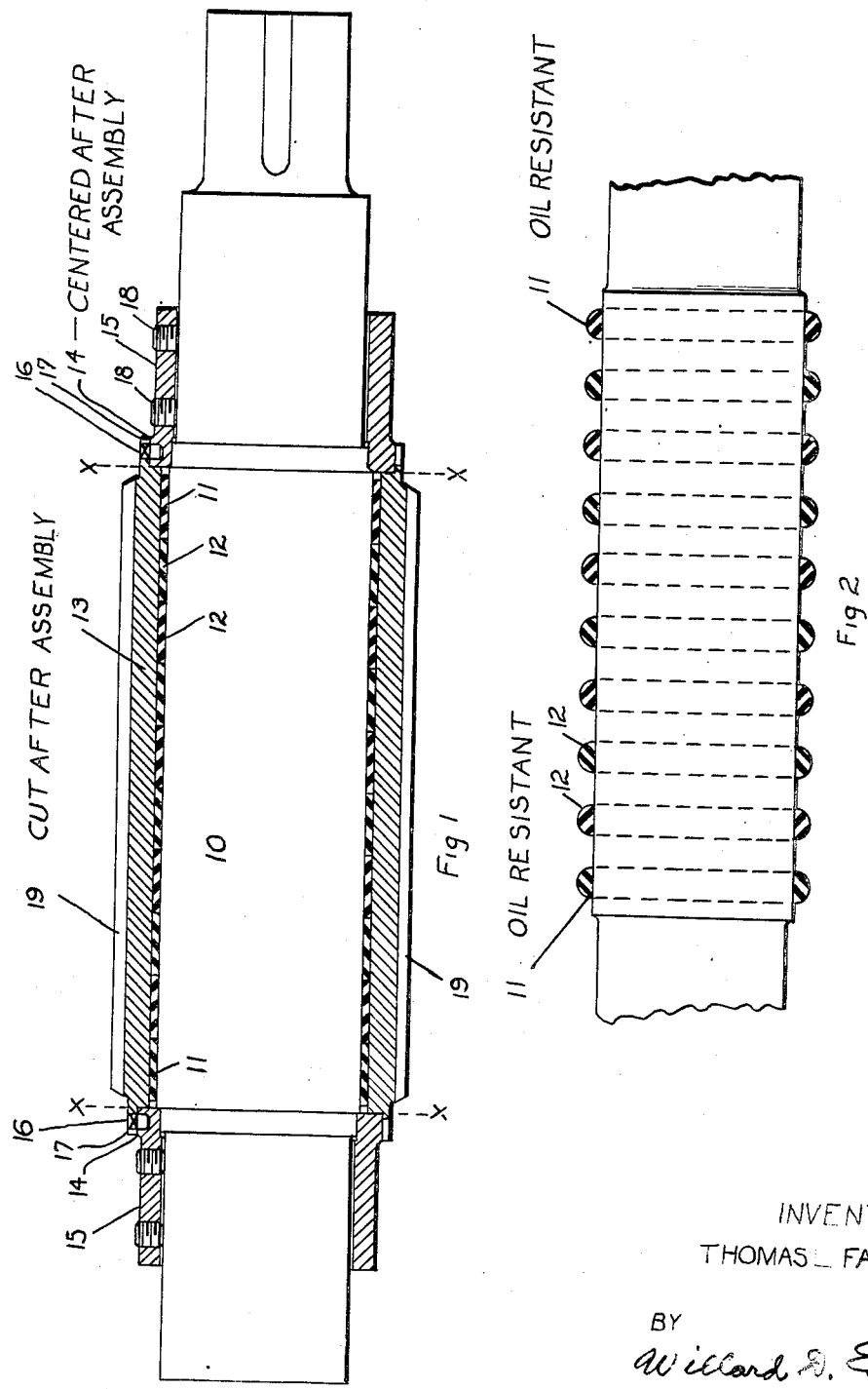
INVENTOR
THOMAS L. FAWICK
BY
Willard D. Eakin
ATTORNEY July 17, 1951

T. L. FAWICK 2,561,103

CUSHIONED GEAR

Original Filed April 27, 1945

INVENTOR
THOMAS L. FAWICK

BY Willard D. Eakin

ATTORNEY

Patented July 17, 1951

2,561,103

UNITED STATES PATENT OFFICE 2,561,103

CUSHIONED GEAR

Thomas L. Fawick, Cleveland, Ohio

Original application April 27, 1945, Serial No. 590,692. Divided and this application July 24, 1946, Serial No. 686,013

2 Claims. (Cl. 64—27)

This invention relates to cushioned gears.

Its chief objects are to provide an improved gear having cushioning means interposed between its toothed portion and its hub or the portion that is adapted to be engaged with a mounting for the gear; to provide accuracy in the cutting of the gear teeth in spite of such eccentricity as may result from the interpositioning of the cushioning means before the teeth are cut; and to provide a gear comprising natural rubber as the cushioning means with improved provision for protecting the rubber from contact with oil.

Other objects are to provide a cushioned gear assembly having a pitch diameter not much greater than the diameter of a shaft which is a part of the assembly, and to provide such a gear with provision for transmission of heavy torque.

The present application is a division of my co-pending application Ser. No. 590,692, filed April 27, 1945, now Patent Number 2,483,267, September 27, 1949.

Of the accompanying drawings:

Fig. 1 is an axial section, with the shaft or hub in elevation, of a gear embodying and made in accordance with my invention in its preferred form.

Fig. 2 is a similar view of the shaft or hub member and cushioning means thereon as they appear at one stage of the process.

Figure 3:
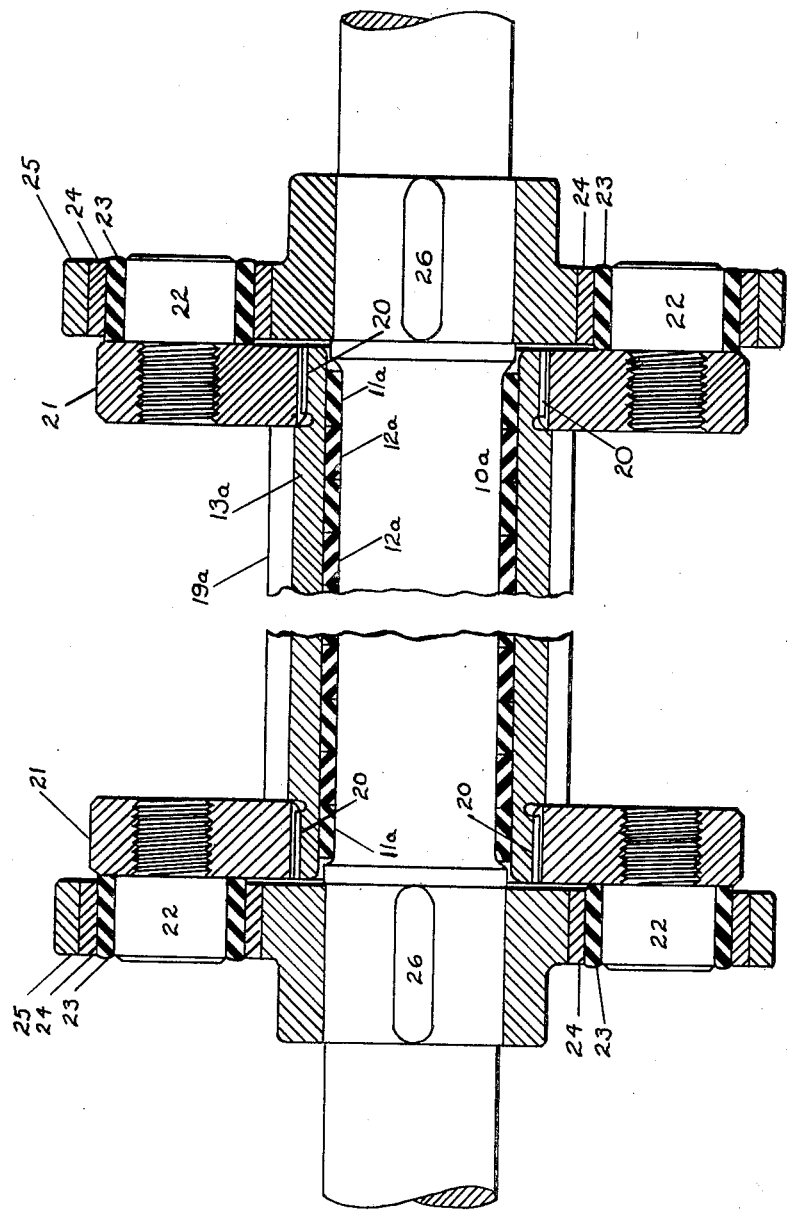
Fig. 3 is an axial section of another embodiment of the invention, with provision for transmission of heavy torque.

Referring to the embodiment illustrated in Figs. 1 and 2 of the drawings, a shaft 10 first has mold vulcanized upon and adhered to it a set of spaced apart, deformable rings, the end rings, 11, 11, being of oil-resistant synthetic material such as neoprene, chlor-butadiene, polymerized vinyl chloride or co-polymers of vinyl chloride and vinyl acetate, and the intermediate rings 12, 12 being of a composition comprising natural rubber, of about the characteristics of tire-tread rubber, for its long-lasting cushioning effect.

The shaft with the deformable rings thereon is then forced lengthwise, in a procedure well known in the art, into a metal sleeve or gear-blank 13 which ultimately becomes the toothed portion of the gear, and the dimensions are such that this operation deforms the rings so that they substantially fill the space between the shaft and the gear-blank, their shape and relation then being as shown in Fig. 1.

The gear blank 13 preferably is preformed with a cylindrical counterbore 14 in each end and, after the assembly of the gear-blank with the shaft and its cushioning rings, which may result in some eccentricity of the blank in relation to the shaft, the cylindrical wall of each counterbore is lightly cut or ground, as by mounting the shaft in a lathe, to make the wall truly concentric with the shaft when the cushions are substantially free from extraneous forces acting between the sleeve and the shaft, and to make it of proper diameter to receive the accurately sized end portion of a spacing collar 15 having upon it an outwardly projecting stud 16 adapted to fit into an open-end slot 17 formed in the end margin of the gear blank, and provided with a pair of set-screws 18, 18 for securing it upon the shaft.

The gear blank thus being held firmly in such relationship to the shaft as is determined by the balance of the forces in the deformed cushioning rings, the set of gear teeth, 19, 19, are formed upon it, while it is so held.

Then the spacing collars 15 are removed from the assembly, and, if desired, the annular end margins of the gear-blank, to the depth of the counterbore, can be cut off, at the lines X—X, and discarded.

The resulting assembly is such that the set of teeth are concentric with the shaft when the cushioning members are in a condition of balanced stresses, and the cushioning action of the gear has its start from that condition.

In the embodiment shown in Fig. 3, the shaft 10a is of waisted form in the region of the resilient rings, 11a and 12a, but the procedure for assembling the shaft and its resilient rings with the gear blank, 13a, and holding the latter in position while the gear teeth, 19a, are cut in concentric relation to the shaft, is substantially the same as that described with reference to Figs. 1 and 2, but while the gear blank is so held it is formed also, at each end, with a set of splines 20, 20, each set being adapted to receive a set of complemented internal splines formed in a driving ring 21.

Each of the driving rings 21 is formed with a circumferentially spaced set of threaded holes for the threaded stems of a set of studs 22, 22, each having secured by vulcanized adhesion on its relatively large cylindrical head a cushioning ring or bushing 23 of rubber-like material which is held under radial compression by a surrounding metal bushing 24, the three members 22, 23 and 24 being assembled as above described with reference to the members 10, 11, 12 and 13 of Figs. 1 and 2.

The outer surface of each of the metal bushings 24 can be lightly cut or ground, after assembly with the cushion 23 and stud 22, by mounting the stud in a lathe, to make the outer surface of the metal bushing concentric with the stud, and of accurate size, with the cushion in a condition of substantially balanced stress. This procedure is mentioned also in my copending application Serial No. 587,892, filed April 12, 1945, now Patent Number 2,460,630, issued February 1, 1949.

The metal bushings 24 of each set occupy, preferably with a fairly tight fit, respective cylindrical holes in a torque-transmitting member 25 secured upon the shaft 10a by a key 26, the members 25 preferably being slid into position, on the bushings 24, after the stud assemblies 22, 23, 24 have been screwed into the members 21.

The gear assembly shown in Fig. 3 is adapted to sustain heavier torque than that shown in Fig. 1, by reason of the fact that the cushions 23 of Fig. 3 sustain the torque in compression instead of only in shear, and because they are at a relatively large radius from the axis of rotation. As the members 23 cushion the torque with relatively high resistance and consequently without great deformation, the cushioning rings 11a, 12a in Fig. 3 serve chiefly for centering the teeth 19a, and for insulating against transmission of vibration or sound, as they and the rubber bushings 23 complete insulate the gear teeth from the shaft.

The invention provides the advantages that are set out in the above statement of objects and modifications are possible without sacrifice of all of those advantages and without departure from the scope of the appended claims.

In the language of the appended claims, the shaft 10 in Fig. 1 or 10a in Fig. 3, is the mounting of the toothed ring 13 or 13a; in Fig. 3 the members 21, 22, 23, 24, 25 and 26, adapted to share the torque load with the cushioning rings 12a, on occasion, are the rotatively interlocking means (as distinguished from means dependent upon adhesion or frictional grip) interposed operatively between, although not physically between, the toothed gear ring and the shaft.

I claim:

1. A cushioned gear assembly comprising a rigid hub member, a rigid toothed gear ring surrounding the hub member and therewith defining an annular space, cushioning means in said space and having engagement with the hub member and the ring for transmission of torque between the two, a rigid drive member directly splined to the toothed ring and of greater radial extent than the tooth portion of the ring, a rigid drive member secured on the hub member in close proximity to the first said drive member, and cushioning means at a radius greater than that of the toothed part of the ring for transmitting torque between the two said rigid drive members.

2. A cushioned gear assembly comprising a rigid hub member, a rigid toothed gear ring surrounding the hub member and therewith defining an annular space, cushioning means in said space and having engagement with the hub member and the ring for transmission of torque between the two, a rigid drive member having driving connection to the toothed ring and of greater radial extent than the tooth portion of the ring, a rigid drive member secured on the hub member in close proximity to the first said drive member, and cushioning means at a radius greater than that of the toothed part of the ring for transmitting torque between the two said rigid drive members.

THOMAS L. FAWICK.

REFERENCES CITED

The following references are of record in the file of this patent:

UNITED STATES PATENTS

| Number | Name | Date |
|---|---|---|
| 1,760,492 | Hall | May 27, 1930 |
| 1,910,179 | Pfannenstiehl | May 23, 1933 |
| 1,928,763 | Rosenberg | Oct. 3, 1933 |
| 1,997,488 | Henry | Apr. 9, 1935 |
| 2,044,392 | Lord | June 16, 1936 |
| 2,390,168 | Piot | Dec. 4, 1945 |

FOREIGN PATENTS

| Number | Country | Date |
|---|---|---|
| 459,216 | Great Britain | of 1935 |